(12) United States Patent
Tang

(10) Patent No.: US 12,052,740 B2
(45) Date of Patent: Jul. 30, 2024

(54) SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 578 days.

(21) Appl. No.: 17/206,015

(22) Filed: Mar. 18, 2021

(65) Prior Publication Data

US 2021/0212079 A1 Jul. 8, 2021

Related U.S. Application Data

(63) Continuation of application No. PCT/CN2018/107122, filed on Sep. 21, 2018.

(51) Int. Cl.
*H04W 72/08* (2009.01)
*H04L 5/00* (2006.01)
(Continued)

(52) U.S. Cl.
CPC ......... *H04W 72/542* (2023.01); *H04L 5/0051* (2013.01); *H04W 72/0453* (2013.01);
(Continued)

(58) Field of Classification Search
CPC ......... H04W 74/0833; H04W 74/0866; H04W 72/085; H04W 72/042; H04W 72/005;
(Continued)

(56) References Cited

U.S. PATENT DOCUMENTS 8,934,430 B2* 1/2015 Zhang .................. H04W 52/22
455/450
11,129,165 B2* 9/2021 Zhou ...................... H04L 5/001
(Continued)

FOREIGN PATENT DOCUMENTS

CN 106572506 A 4/2017
CN 108023704 A 5/2018
(Continued)

OTHER PUBLICATIONS

Guangdong OPPO Mobile Telecommunications Corp. Ltd., Extended European Search Report, EP18934013.6, Jul. 21, 2021, 11 pgs.
(Continued)

*Primary Examiner* — Rasheed Gidado
(74) *Attorney, Agent, or Firm* — Morgan, Lewis & Bockius LLP

(57) ABSTRACT

The embodiments of the present application provide a signal transmission method, a transmitting end device, and a receiving end device. The method includes: sending, by a transmitting end device, a first reference signal to a receiving end device on a first subband. The first reference signal is a reference signal used to assist the receiving end device in estimating a channel quality of the first subband.

11 Claims, 9 Drawing Sheets

(51) Int. Cl.
- *H04W 72/00* (2023.01)
- *H04W 72/04* (2023.01)
- *H04W 72/0453* (2023.01)
- *H04W 72/23* (2023.01)
- *H04W 72/30* (2023.01)
- *H04W 72/542* (2023.01)
- *H04W 74/08* (2024.01)
- *H04W 74/0833* (2024.01)

(52) U.S. Cl.
CPC .......... *H04W 72/23* (2023.01); *H04W 72/30* (2023.01); *H04W 74/0833* (2013.01)

(58) Field of Classification Search
CPC . H04W 72/0453; H04W 72/30; H04W 72/23; H04W 72/02; H04W 72/78; H04L 5/0051; H04L 5/0037; H04L 5/0091; H04L 5/0023
See application file for complete search history.

(56) References Cited

U.S. PATENT DOCUMENTS

| | | | |
|---|---|---|---|
| 2015/0358931 A1* | 12/2015 | Koorapaty | H04W 72/044 370/330 |
| 2017/0063436 A1* | 3/2017 | Li | H04L 5/0048 |
| 2017/0064702 A1* | 3/2017 | Li | H04W 74/0816 |
| 2017/0188352 A1 | 6/2017 | Lee et al. | |
| 2017/0257238 A1* | 9/2017 | Qian | H04L 25/03834 |
| 2018/0205507 A1* | 7/2018 | John Wilson | H04L 5/0051 |
| 2018/0331727 A1* | 11/2018 | John Wilson | H04W 72/046 |
| 2019/0109746 A1* | 4/2019 | Hosseini | H04W 72/20 |
| 2019/0222288 A1* | 7/2019 | Zhou | H04B 7/0665 |
| 2020/0186303 A1* | 6/2020 | Hao | H04B 7/0626 |
| 2020/0404690 A1* | 12/2020 | Lee | H04L 5/005 |

FOREIGN PATENT DOCUMENTS

| | | |
|---|---|---|
| CN | 108289331 A | 7/2018 |
| EP | 3364683 A1 | 8/2018 |
| EP | 3528417 A1 | 8/2019 |
| EP | 3748889 A1 | 12/2020 |
| WO | WO2018/026182 A1 | 2/2018 |
| WO | WO2018/082395 A1 | 5/2018 |
| WO | WO2018/132448 A1 | 7/2018 |
| WO | WO2019160720 A1 | 8/2019 |
| WO | WO2020/056774 A1 | 3/2020 |

OTHER PUBLICATIONS

Nokia et al., "Remaining details on NR-PBCH," 3GPP TSG-RAN WG1 NR AH#3, R1-1716524, Nagoya, Japan, Sep. 18-21, 2017, 13 pgs.

Guangdong OPPO Mobile Telecommunications Corp., Ltd., EP18934013.6, First Office Action, Apr. 3, 2023, 8 pgs.

VIVO, "Discussion on physical UL channel design in NR unlicensed spectrum", R1-1808236, 3GPP TSG-RAN WG1 Meeting #94, Gothenburg, Sweden, Aug. 20-24, 2018, 3 pgs.

Guangdong OPPO Mobile Telecommunications Corp., Ltd., International Search Report and Written Opinion, PCT/CN2018/107122, 19JUN2019, 12 pgs.

* cited by examiner

SIGNAL TRANSMISSION METHOD, TERMINAL DEVICE, AND NETWORK DEVICE

CROSS REFERENCE TO RELATED APPLICATIONS

This application is a continuation application of PCT Patent Application No. PCT/CN2018/107122, filed on Sep. 21, 2018, which is incorporated herein by reference in its entirety.

TECHNICAL FIELD

Embodiments of the present disclosure generally relate to communication technologies, and more particularly, to signal transmission methods, terminal devices, and network devices.

BACKGROUND

In the 5th-Generation mobile communication technologies (New Radio, NR), sequences of Demodulation Reference Signal (DMRS) for a Physical Downlink Control Channel (PDCCH), a Physical Downlink Shared Channel (PDSCH), and a Physical Broadcast Channel (PBCH) are generated independently. The resource mapping positions of DMRSs for PDCCH, PDSCH, and PBCH are generated independently in the time-frequency domain. The PDCCH DMRS supports antenna port 2000, PDSCH DMRS supports antenna port 1000 to antenna port 1011 depending on the configuration, and PBCH DMRS supports antenna port 4000. The above-mentioned independent designs, on the one hand, will reduce resource utilization when resources are limited, and on the other hand, such independent DMRS design with independent parameters such as parameters for sequence generation, resource position, port configuration and so on cannot be used well for terminal devices to do joint estimation of a channel.

When the 5G NR system is applied to unlicensed spectrum, how to design signals (for example, DMRS) and channels (for example, PDCCH, PDSCH, and PBCH) for initial access on unlicensed spectrum is an urgent problem to be solved. Furthermore, on the unlicensed spectrum, a Listen Before Talk (LBT) principle is used, and channel listening is conducted before the channel can be used for signal transmission. When a network device detects an available channel one time, the need for the network device to use this transmission opportunity to send necessary signals and channels which are to be found by a terminal device and are used to access a cell stands out. Also, under the condition that the available resources of the unlicensed frequency band are restricted in the time and frequency domains, how to design the resource utilization relationship between various signals and channels related to the initial access is also an urgent problem to be solved.

SUMMARY

Embodiments of the present disclosure provide a signal transmission method, a transmitting end device and a receiving end device. When available resources are limited, embodiments of the present disclosure can unify the designs of the NR-U reference signal in an initial access subband in the unlicensed frequency band, so that when a terminal device demodulates PBCH, PDCCH, PDSCH or other channels in the NR-U reference signal, the terminal device can use the reference signal according to its actual needs. This unified design is conducive to effective use of limited time-frequency resources in the initial access subband of the unlicensed frequency band, and effective use of limited chance of success for LBT.

According to a first aspect, there is provided signal transmission method, including:
 sending, by a transmitting end device, a first reference signal to a receiving end device on a first subband, wherein the first reference signal is a reference signal used to assist the receiving end device in estimating a channel quality of the first subband.

According to embodiments, the transmitting end device may be a network device, and the receiving end device may be a terminal device.

According to a second aspect, there is provided signal transmission method, including:
 receiving, by a receiving end device, a first reference signal from a transmitting end device on a first subband, wherein the first reference signal is a reference signal used to assist the receiving end device in estimating a channel quality of the first subband.

According to embodiments, the transmitting end device may be a network device, and the receiving end device may be a terminal device.

According to a third aspect, there is provided a transmitting end device configured to perform the method according to the first aspect or any implementation of the first aspect.

Specifically, the transmitting end device includes functional modules configured to perform the method according to the first aspect or any implementation of the first aspect.

According to a fourth aspect, there is provided a receiving end device configured to perform the method according to the second aspect or any implementation of the second aspect.

Specifically, the receiving end device includes functional modules configured to perform the method according to the second aspect or any implementation of the second aspect.

According to a fifth aspect, there is provided a transmitting end device, including a processor and a memory. The memory is configured to store a computer program, and the processor is configured to call and run the computer program stored in the memory to perform the method according to the first aspect or any implementation of the first aspect.

According to a sixth aspect, there is provided a receiving end device, including a processor and a memory. The memory is configured to store a computer program, and the processor is configured to call and run the computer program stored in the memory to perform the method according to the second aspect or any implementation of the second aspect.

According to a seventh aspect, there is provided a chip configured to implement the method according to any one of the first to second aspects or any implementation of the first to seconds aspects.

Specifically, the chip includes a processor configured to call and run a computer program stored in a memory to cause a device in which the chip is installed to perform the method according to any one of the first to second aspects or any implementation of the first to second aspects.

According to an eighth aspect, there is provided a computer-readable storage medium configured to store a computer program, wherein the computer program is configured to cause a computer to perform the method according to any one of the first to second aspects or any implementation of the first to second aspects.

According to a ninth aspect, there is provided a computer program product including computer program instructions that cause a computer to perform the method according to any one of the first to second aspects or any implementation of the first to second aspects.

According to a tenth aspect, there is provided a computer program. When the computer program is run on a computer, the computer is caused to perform the method according to any one of the first to second aspects or any implementation of the first to second aspects.

By using the above technical solutions, when available resources are limited, embodiments of the present disclosure can unify the designs of the NR-U reference signal in an initial access subband in the unlicensed frequency band, so that when a terminal device demodulates PBCH, PDCCH, PDSCH or other channels in the NR-U reference signal, the terminal device can use the reference signal according to its actual needs. This unified design is conducive to effective use of limited time-frequency resources in the initial access subband of the unlicensed frequency band, and effective use of limited chance of success for LBT.

DETAILED DESCRIPTION

Technical solutions in embodiments of the present disclosure will be described below with reference to drawings. Obviously, the described embodiments are a part of the embodiments of the present disclosure, not all of the embodiments. Based on the embodiments described herein, all other embodiments obtained by those of ordinary skill in the art without creative work are within the scope of protection of the present disclosure.

Embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (Wi-Fi), next-generation communication system or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), and Vehicle to Vehicle (V2V) communications, etc. Embodiments of the present disclosure can be applied to these communications systems.

The communication systems in embodiments of the present disclosure can be applied to a Carrier Aggregation (CA) scenario, can also be applied to a Dual Connectivity (DC) scenario, and can also be applied to a standalone (SA) network deployment scenario.

The spectrum which embodiments of the present disclosure can be applied in is not limited. For example, embodiments of the present disclosure may be applied to licensed spectrum or unlicensed spectrum.

Figure 1:
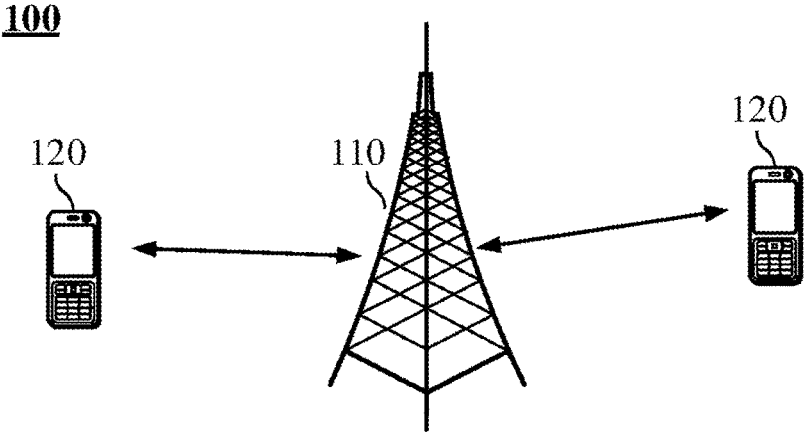
FIG. 1 is a schematic diagram of communication system architecture according to an embodiment of the present disclosure.

As an example, a communication system 100 applied in embodiments of the present application is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with terminal devices in the coverage area.

FIG. 1 illustratively shows one network device and two terminal devices. According to other embodiments, the communication system 100 may include multiple network devices and the coverage of each network device may include other numbers of terminal devices, and embodiments of the present disclosure do not impose specific limitations on this.

According to some embodiments, the communication system 100 may also include other network entities such as a network controller or a mobility management entity, and embodiments of the present disclosure do not impose specific limitations on this.

It should be understood that the devices with communication functions in the network/system in the embodiments of the present application may be referred to as communication devices. Taking the communication system 100 shown in FIG. 1 as an example, the communication devices may include the network device 110 and the terminal devices 120 which have communication functions. The network device 110 and the terminal devices 120 may be the specific devices described above, which will not be repeated here. The communication devices may also include other devices in the communication system 100, such as a network controller, a mobility management entity and other network entities, and embodiments of the present disclosure do not impose specific limitations on this.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc. The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device (gNB) in an NR network, or a network device in future evolved PLMN network.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

It should be understood that in the studies of 5G NR, a terminal device needs to access a cell by an initial active bandwidth part (BWP). In the cell access procedure, the terminal device needs to sequentially demodulate the PBCH, the PDCCH for Remaining System Information (RMSI), the PDSCH for the RMSI, and other PDCCH and PDSCH channels associated with broadcast acquisition and random access. When the terminal device demodulates these channels, the terminal device needs to rely on the DMRS associated with these channels for channel estimation to obtain better channel demodulation effects.

In the studies of 5G unlicensed spectrum, how to design signals and channels for initial access on unlicensed spectrum is a new problem. Furthermore, on the unlicensed spectrum, a LBT principle is used, and channel listening is conducted before the channel can be used for signal transmission. When a network device detects an available channel one time, the need for the network device to use this transmission opportunity to send necessary signals and channels which are to be found by a terminal device and are used to access a cell stands out. Also, under the condition that the available resources of the unlicensed frequency band are restricted in the time and frequency domains, how to design the resource utilization relationship between various signals and channels related to the initial access is also a new problem. The present disclosure proposes a demodulation signal design method in consideration of the above constraints and problems. When the available resources are limited, DMRS designs are unified among NR-U reference signals in an initial access subband in the unlicensed frequency band, so that when a terminal device demodulates PBCH, PDCCH, PDSCH or other channels in the NR-U reference signals, the terminal device can use the reference signals according to its actual needs.

Figure 2:
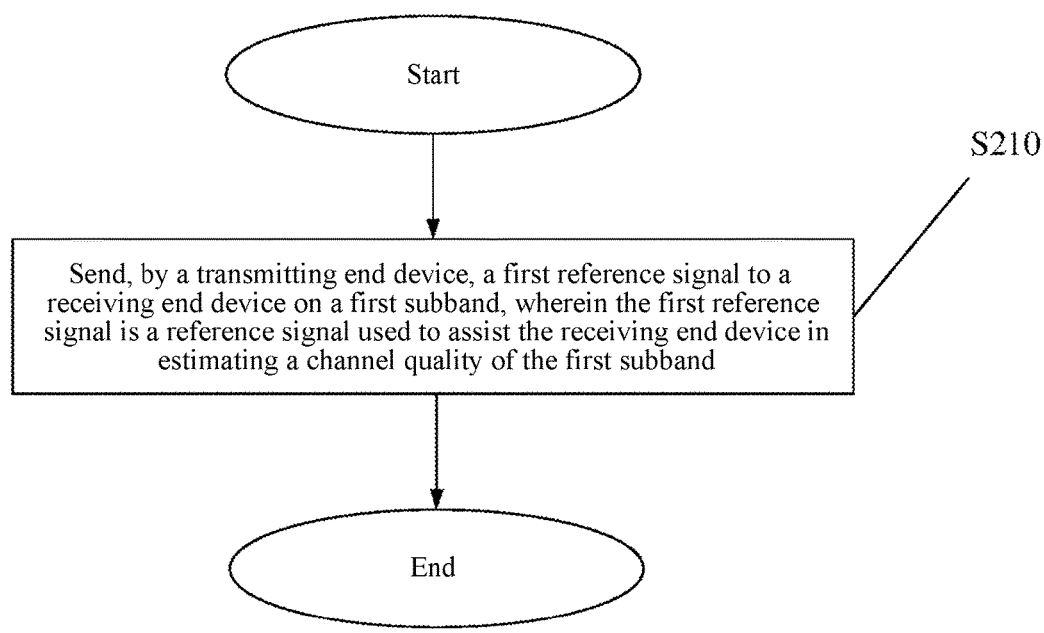
FIG. 2 is a schematic flowchart of a signal transmission method according to an embodiment of the present disclosure.

FIG. 2 is a schematic flowchart of a signal transmission method 200 according to an embodiment of the present disclosure. As shown in FIG. 2, the method 200 may include the following content:

In S210, a transmitting end device sends a first reference signal to a receiving end device on a first subband. The first reference signal is a reference signal used to assist the receiving end device in estimating a channel quality of the first subband.

According to embodiments of the present disclosure, the transmitting end device may be a network device, and the receiving end device may be a terminal device. Specifically, transmitting end device and the receiving end device may be the network device and the terminal device as shown in FIG. 1.

According to embodiments of the present disclosure, the first subband is an initial active bandwidth part on the unlicensed spectrum.

According to embodiments of the present disclosure, the transmitting end device sends the first reference signal to the receiving end device at a first frequency domain position in a first time domain position in the first subband.

According to embodiments of the present disclosure, the first frequency domain position is a part or all of a first candidate frequency domain position in the first subband.

That is, the transmitting end device may send the first reference signal on part or all of the Resource Elements (REs) corresponding to the first candidate frequency domain.

For example, the transmitting end device sends the first reference signal on a part of REs corresponding to the first candidate frequency domain, and the receiving end device receives the first reference signal on a part of REs corresponding to the first candidate frequency domain.

For another example, the transmitting end device transmits the first reference signal on all REs corresponding to the first candidate frequency domain, and the receiving end device receives the first reference signal on some of the REs corresponding to the first candidate frequency domain.

For another example, the transmitting end device transmits the first reference signal on all REs corresponding to the first candidate frequency domain, and the receiving end device receives the first reference signal on all REs corresponding to the first candidate frequency domain.

According to embodiments of the present disclosure, the first candidate frequency domain position is a set of subcarrier positions obtained by selecting a subcarrier from every p subcarriers with a subcarrier resulted from shifting a subcarrier k by v subcarriers as a starting point;

wherein the subcarrier k is a reference starting point of the first candidate frequency domain position, a position resulted from shifting the subcarrier k by v subcarriers is an actual starting point of the first candidate frequency domain position, and v and p are integers.

According to embodiments of the present disclosure, the subcarrier k may be as follows:

the subcarrier k is a first subcarrier of a Resource Block (RB) with the smallest number in the first subband; or the subcarrier k is a first subcarrier of a RB with the smallest number in a PBCH in the first subband; or the subcarrier k is a first subcarrier of a RB with the smallest number that partially or fully overlaps the PBCH in the first subband.

According to embodiments of the present disclosure, v may be as follows:

v is a preset integer; or v is an integer configured by the transmitting end device; or v is an integer associated with a first parameter, and the transmitting end device and/or the receiving end device determines v according to the first parameter.

According to embodiments of the present disclosure, the first parameter may be as follows:

the first parameter is a physical cell identity (ID) of the transmitting end device; or the first parameter is a synchronization signal block index of the transmitting end device.

According to embodiments of the present disclosure, p may be as follows:

p is a preset integer; or p is an integer configured by the transmitting end device.

According to embodiments of the present disclosure, the transmitting end device may determine the first reference signal in the following manner:

generating, by the transmitting end device, a first candidate sequence;

making each element of the first candidate sequence sequentially correspond to a Resource Element (RE) corresponding to the first candidate frequency domain position by the transmitting end device; and sending, at the first candidate frequency domain position by the transmitting end device, an element of the first candidate sequence which corresponds to the first candidate frequency domain position to the receiving end device as the first reference signal.

According to embodiments of the present disclosure, the first time domain position is one of the following:

a symbol position where a Primary Synchronization Signal (PSS) is located;

a symbol position where a Secondary Synchronization Signal (SSS) is located;

a part or all of symbol positions where PBCH is located;

a part or all of symbol positions where a PDCCH for scheduling broadcast information is located;

a part or all of symbol positions of a PDSCH carrying broadcast information is located;

a part or all of symbol positions where a PDCCH for scheduling a message 2 (Msg2) for random access is located;

a part or all of symbol positions where a PDSCH carrying Msg2 for random access is located;

a part or all of symbol positions where a PDCCH for scheduling a message 4 (Msg4) for random access is located;

a part or all of symbol positions where a PDSCH carrying Msg4 for random access is located;

a part or all of symbol positions where a PDCCH for scheduling a paging message is located; or a part or all of symbol positions where a PDSCH carrying the paging message is located.

According to embodiments of the present disclosure, the first reference signal is one of the following:

DMRS for PBCH;

DMRS for PDCCH for scheduling broadcast information;

DMRS for a Control Resource Set (CORESET) where a PDCCH for scheduling broadcast information is located;

DMRS for a PDSCH carrying broadcast information;

DMRS for a PDCCH for scheduling a Random Access Response (RAR) message;

DMRS for a CORESET where a PDCCH for scheduling a RAR message is located;

DMRS for a PDSCH carrying a RAR message;

DMRS for a PDCCH for scheduling a MSG4 for random access;

DMRS for a CORESET where a PDCCH for scheduling a MSG4 for random access is located;

DMRS for a PDSCH carrying a MSG4 for random access;

DMRS for a PDCCH for scheduling a paging message;

DMRS for a CORESET where a PDCCH for scheduling a paging message is located; or

DMRS for a PDSCH carrying a paging message.

According to embodiments of the present disclosure, the transmitting end device sends first information to the receiving end device, and there is a fixed deviation between an Energy Per Resource Element (EPRE) of the first reference signal and an EPRE of the first information.

It should be noted that there is a fixed difference between the EPRE of the first reference signal and the EPRE of the first information, which can reduce the complexity of the demodulation reference signal.

According to embodiments of the present disclosure, the fixed difference is M decibels, where M is an integer.

It should be noted that M can be 0 or a positive integer.

According to embodiments of the present disclosure, the M is preset on the transmitting end device or configured by the transmitting end device.

According to embodiments of the present disclosure, the first information is one of the following:

PSS; SSS; PBCH; DMRS for a PBCH; DMRS for a PDCCH for scheduling broadcast information; DMRS for a PDSCH carrying broadcast information; DMRS for a PDCCH for scheduling a Msg2 for random access; DMRS for a PDSCH carrying Msg2 for random access; DMRS for a PDCCH for scheduling a Msg4 for random access; DMRS for a PDSCH carrying a Msg4 for random access; DMRS for a PDCCH for scheduling a paging message; or DMRS for a PDSCH carrying a paging message.

According to embodiments of the present disclosure, the subcarrier spacing of the first reference signal and the subcarrier spacing of the first information are the same.

It should be noted that by make the subcarrier spacing of the first reference signal the same as the subcarrier spacing of the first information, the complexity of demodulating the reference signal can be reduced.

According to embodiments of the present disclosure, the length of the cyclic prefix of the first reference signal and the length of the cyclic prefix of the first information are the same.

It should be noted that by making the length of the cyclic prefix of the first reference signal the same as the length of the cyclic prefix of the first information, the complexity of the demodulation reference signal can be reduced.

Hereinafter, with reference to FIGS. 3 to 8, the signal transmission method 200 according to embodiments of the present disclosure will be described in detail. Specifically, FIGS. 3 to 8 can correspond to first to six embodiments respectively. In first to six embodiments, the transmitting end device is a base station, and the receiving end device is a terminal device, for example. Further, in first to six embodiments, the Physical Cell Identifier (PCI) of the base station is 7 for example, that is, $N_{ID}^{cell}=7$.

Figure 3:
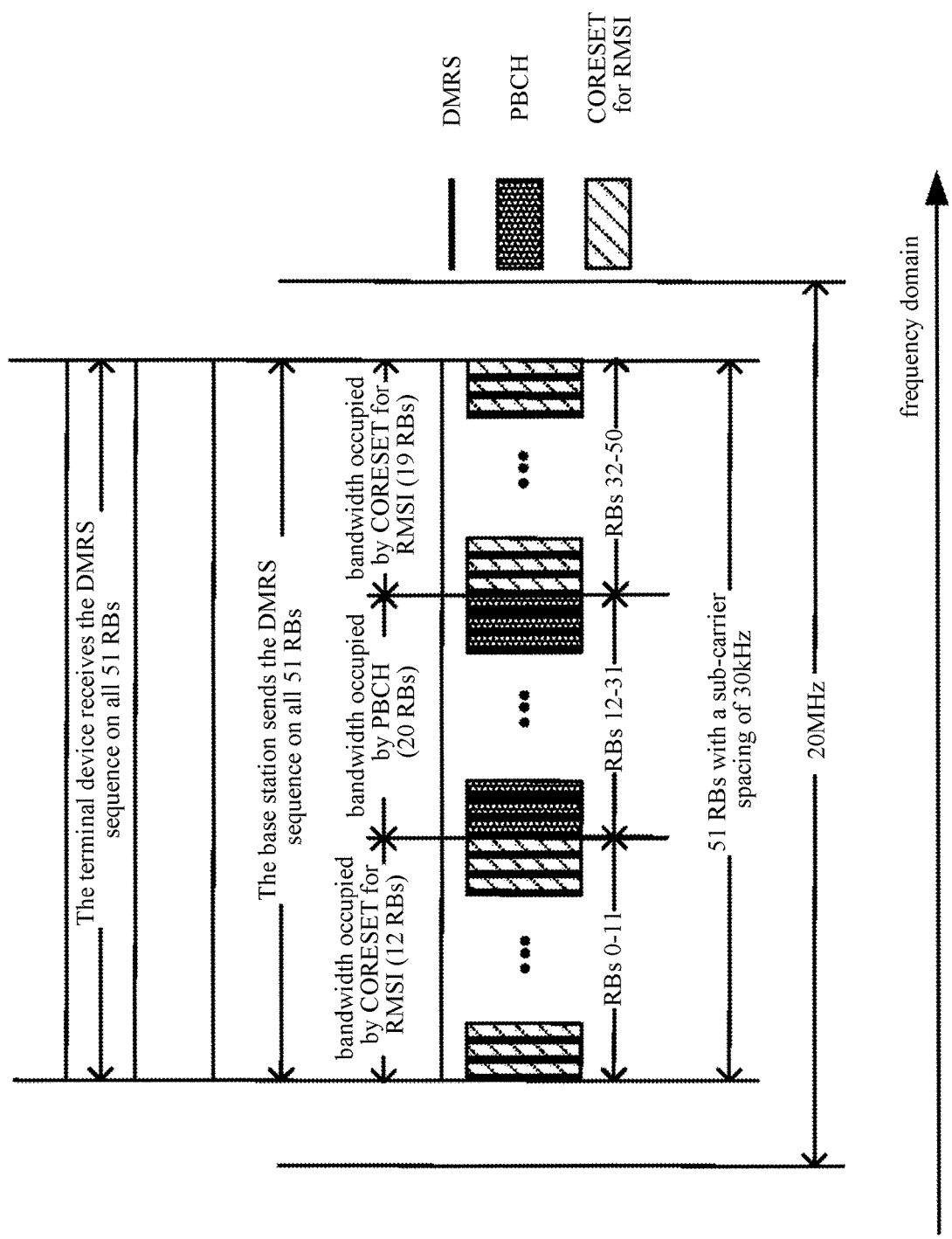
FIG. 3 is a schematic diagram showing signal transmission according to an embodiment of the present disclosure.

As the first embodiment, as shown in FIG. 3, the base station (PCI=7) transmits a synchronization signal block (SS/PBCH block, SSB) in the initial access subband (51 RBs with a sub-carrier spacing of 30 kHz within 20 MHz). The SSB is located on RBs 12-31 (20 RBs) in the initial access subband.

The base station (PCI=7) configures the CORESET for RMSI in the initial access subband. The CORESET for RMSI and SSB are configured in a frequency-division multiplexing (FDM) mode. The CORESET for RMSI is located on RBs 0-11 (12 RBs) and RBs 32-50 (19 RBs) in the initial access subband.

It should be noted that the PBCH is a part of the SSB, that is, the frequency domain position of the PBCH is the same as the frequency domain position of the SSB. In FIG. 3, the position of the PBCH is taken as an example for illustration.

The base station (PCI=7) sends a DMRS sequence A on the symbols of the PBCH in the initial access subband. The DMRS sequence A contains 153 REs. The base station takes a subcarrier resulted from shifting the first subcarrier of the first RB in the initial access subband by $v=3$ ($v=N_{ID}^{cell}$ mod 4) subcarriers as a starting point, selects one RE every 4 REs, and a total of 153 REs are selected. The base station maps the DMRS sequence A to the positions of the selected REs (the 153 selected REs) in turn and sends the DMRS sequence A. That is, the first sequence element of the DMRS sequence A is sent on the first RE selected by the base station, and the L-th element of the DMRS sequence A is sent on the L-th RE selected by the base station.

Optionally, in the first embodiment, the power difference between the EPRE of the DMRS and the EPRE of the PBCH included in the DMRS sequence A is 0 decibels (dB), and the DMRS and PBCH included in the DMRS sequence A use the Normal Cyclic Prefix (NCP), and DMRS and PBCH are sent using the same antenna port.

As shown in FIG. 3, in the first embodiment, on the symbols of the PBCH within the bandwidth occupied by the initial access subband, the terminal device takes a subcarrier resulted from shifting the first subcarrier of the first RB in the bandwidth occupied by the initial access subband by $v=3$ ($v=N_{ID}^{cell}$ mod 4) subcarriers as a starting point, selects one RE every 4 REs, and a total of 153 REs are selected to receive the DMRS sequence A. The terminal device assumes that on the above REs, the base station sequentially maps the DMRS sequence A to the positions of the selected REs from the first element and sends all the elements in the DMRS sequence A, that is, the first sequence element of the DMRS sequence A is sent on the first RE selected by the base station, and the L-th element of the DMRS sequence A is sent on the L-th RE selected by the base station.

Optionally, in the first embodiments, the terminal devices assumes that the power difference between the EPRE of the DMRS and the EPRE of the PBCH is 0 dB on the above REs (153 selected REs), the DMRS and the PBCH both use NCP, and the DMRS and PBCH are sent using the same antenna port. The terminal device receives all of the DMRS sequence in the bandwidth occupied by the initial access subband under the above assumptions to estimate the channel quality of the initial access subband.

Figure 4:
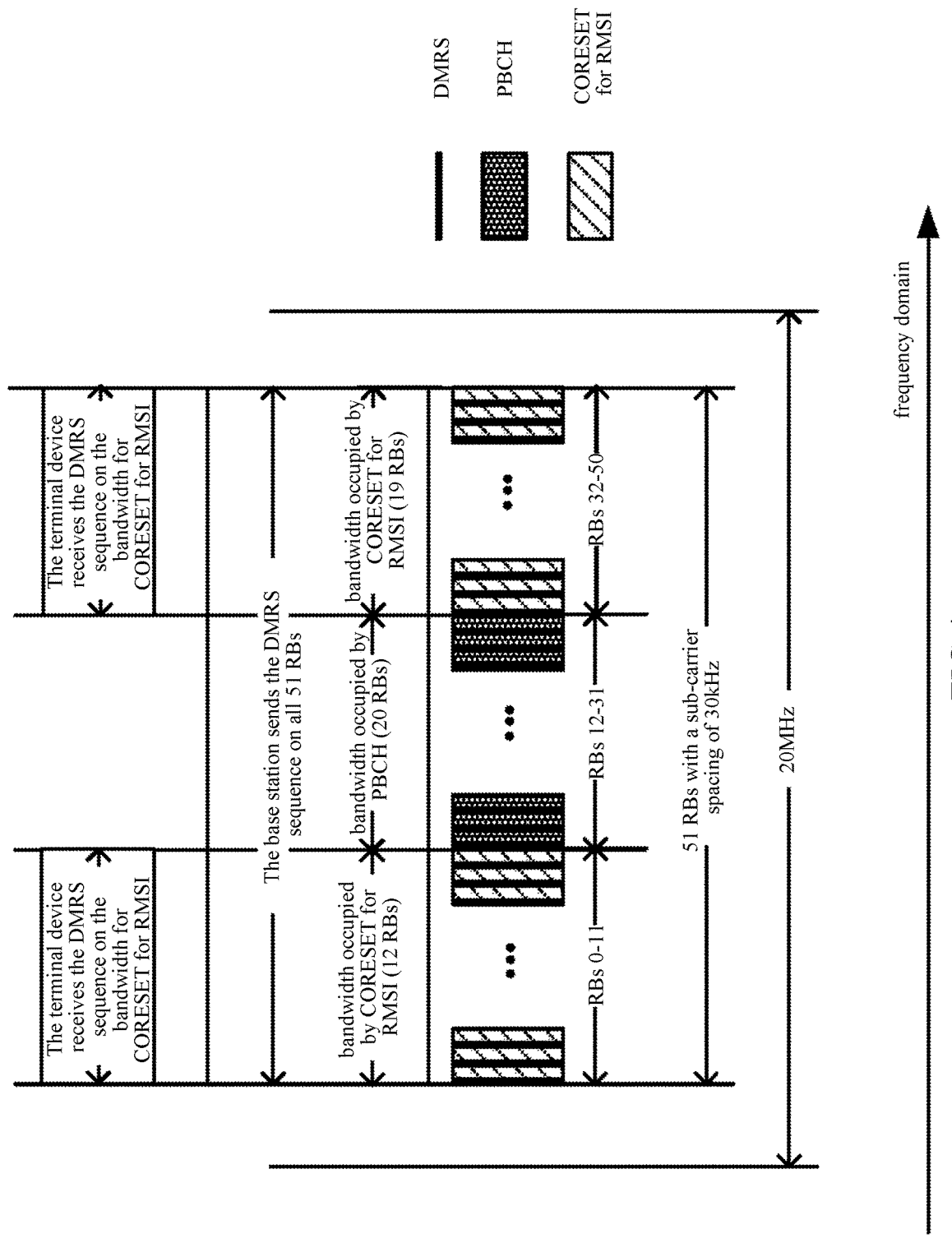
FIG. 4 is a schematic diagram showing signal transmission according to an embodiment of the present disclosure.

As the second embodiment, as shown in FIG. 4, the base station (PCI=7) transmits a SSB in the initial access subband (51 RBs with a sub-carrier spacing of 30 kHz within 20 MHz). The SSB (or PBCH) is located on RBs 12-31 (20 RBs) in the initial access subband.

The base station (PCI=7) configures the CORESET for RMSI in the initial access subband. The CORESET for RMSI and SSB are configured in a FDM mode. The CORESET for RMSI is located on RBs 0-11 (12 RBs) and RBs 32-50 (19 RBs) in the initial access subband.

The base station (PCI=7) sends a DMRS sequence A on the symbols of the PBCH in the initial access subband. The DMRS sequence A contains 153 elements. The base station takes a subcarrier resulted from shifting the first subcarrier of the first RB in the initial access subband by $v=3$ ($v=N_{ID}^{cell}$ mod 4) subcarriers as a starting point, selects one RE every 4 REs, and a total of 153 REs are selected. The base station maps the DMRS sequence A to the positions of the selected REs (the 153 selected REs) in turn and sends the DMRS sequence A. That is, the first sequence element of the DMRS sequence A is sent on the first RE selected by the base station, and the L-th element of the DMRS sequence A is sent on the L-th RE selected by the base station.

Optionally, in the second embodiment, the power difference between the EPRE of the DMRS and the EPRE of the PBCH included in the DMRS sequence A is 0 dB, and the DMRS and PBCH included in the DMRS sequence A use NCP, and DMRS and PBCH are sent using the same antenna port.

As shown in FIG. 4, in the second embodiment, when the terminal device needs to demodulate the PDCCH for RMSI, within the bandwidth (RBs 0-11 and RBs 32-50) occupied by the CORESET for RMSI, the terminal device takes a subcarrier resulted from shifting the first subcarrier of the first RB in the bandwidth occupied by the CORESET for RMSI by $v=3$ ($v=N_{ID}^{cell}$ mod 4) subcarriers as a starting point, selects one RE every 4 REs, and a total of 93 REs are selected to receive a subset of the DMRS sequence A. The terminal device assumes that on the above REs (the 93 selected REs), the base station sequentially maps the 36 elements starting from the first element and 57 elements starting from the 97-th element in the DMRS sequence A to the positions of the selected REs and sends the elements in the DMRS sequence A. The first sequence element of the DMRS sequence A is sent on the first RE selected by the base station, and the L-th element of the DMRS sequence A is sent on the L-th RE selected by the base station.

Optionally, in the second embodiments, the terminal devices assumes that the power difference between the EPRE of the DMRS and the EPRE of the PBCH is 0 dB on the above REs, the DMRS and the PBCH both use NCP, and the DMRS and PBCH are sent using the same antenna port. The terminal device receives the DMRS sequence in the bandwidth occupied by the CORESET for RMSI under the above assumptions to estimate the channel quality of the channel occupied by the CORESET for RMSI.

Figure 5:
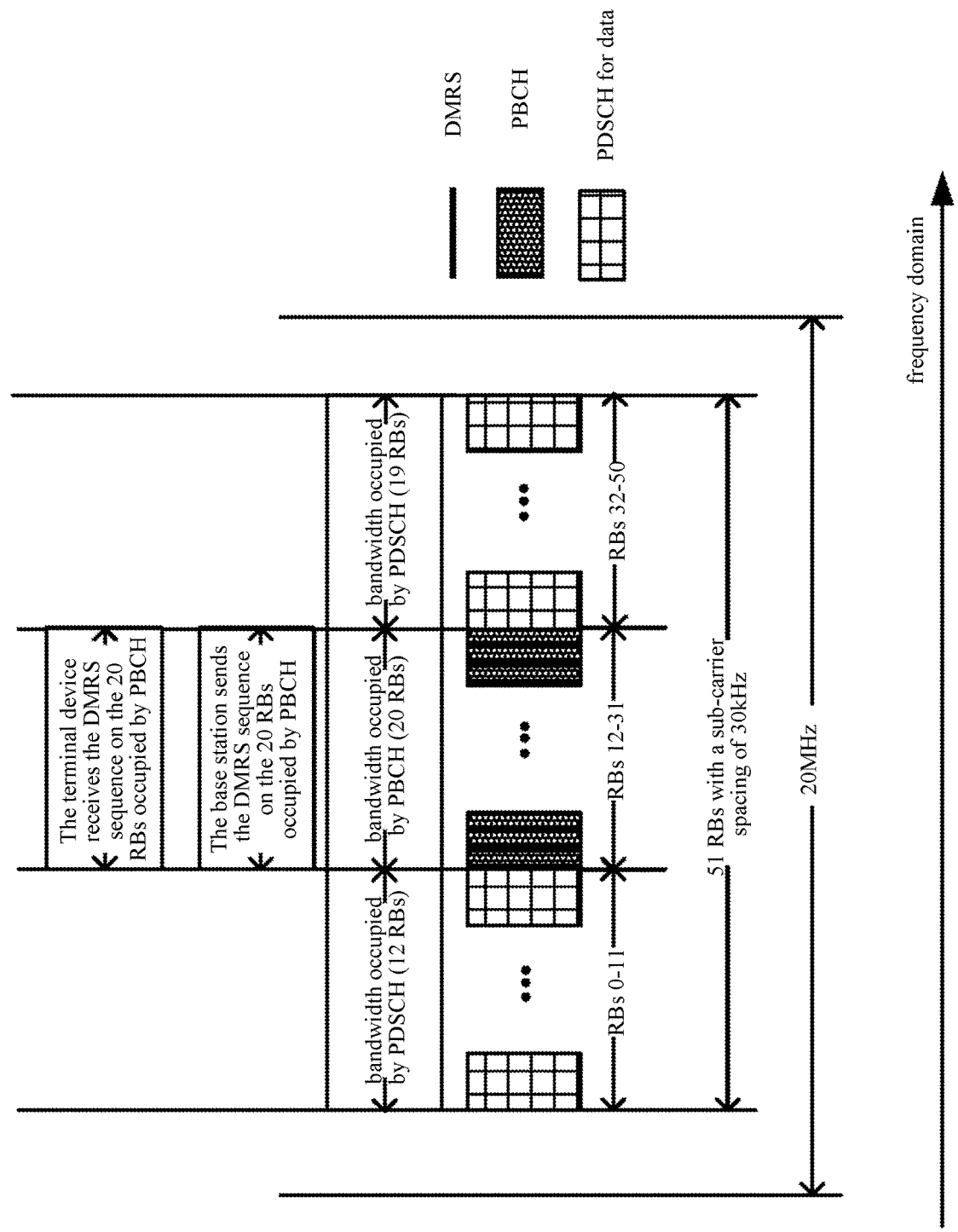
FIG. 5 is a schematic diagram showing signal transmission according to an embodiment of the present disclosure.

As the third embodiment, as shown in FIG. 5, the base station (PCI=7) transmits a SSB in the initial access subband (51 RBs with a sub-carrier spacing of 30 kHz within 20 MHz). The SSB (or PBCH) is located on RBs 12-31 (20 RBs) in the initial access subband.

The base station (PCI=7) sends PDSCH carrying data in the initial access subband. The PDSCH carrying data and SSB are sent in a FDM mode. The PDSCH carrying data is located on RBs 0-11 (12 RBs) and RBs 32-50 (19 RBs) in the initial access subband.

The base station (PCI=7) sends a part of elements of a DMRS sequence A on the symbols of the PBCH in the frequency domain bandwidth occupied by SSB. The DMRS sequence A contains 153 elements. The base station takes a subcarrier resulted from shifting the first subcarrier of the first RB in the frequency domain bandwidth occupied by PBCH in SSB (the RBs 12-31 in the initial access subband) by v=3 ($v=N_{ID}^{cell}$ mod 4) subcarriers as a starting point, selects one RE every 4 REs, and a total of 60 REs are selected. The base station maps 60 elements starting from the 37-th element in the DMRS sequence A (which is composed of 153 elements) to the 60 selected REs and sends the elements. That is, the base station only sends a corresponding part of the DMRS sequence A in the frequency domain bandwidth occupied by SSB, and does not send the DMRS sequence A at the remaining positions.

Optionally, in the third embodiment, the power difference between the EPRE of the sent DMRS (the DMRS sent on the 60 selected REs) and the EPRE of the PBCH is 0 dB, and the sent DMRS and PBCH both use NCP, and the sent DMRS and PBCH are sent using the same antenna port.

As shown in FIG. 5, in the third embodiment, on the symbols of the PBCH within the bandwidth (RBs 12-31) occupied by PBCH, the terminal device takes a subcarrier resulted from shifting the first subcarrier of the first RB in the bandwidth occupied by PBCH by v=3 (v=N mod 4) subcarriers as a starting point, selects one RE every 4 REs, and a total of 60 REs are selected to receive a subset of the DMRS sequence A. The terminal device assumes that on the above REs (the 60 selected REs), the base station sequentially maps the 60 elements starting from the 37-th element in the DMRS sequence A (which is composed of 153 elements) to the positions of the 60 selected REs and sends the elements in the DMRS sequence A.

Optionally, in the third embodiments, the terminal devices assumes that the power difference between the EPRE of the DMRS and the EPRE of the PBCH is 0 dB on the above selected REs (the 60 selected REs), the DMRS and PBCH both use NCP, and the DMRS and PBCH are sent using the same antenna port. The terminal device receives the DMRS sequence in the bandwidth occupied by the PBCH under the above assumptions to estimate the channel quality of the channel occupied by the PBCH.

Figure 6:
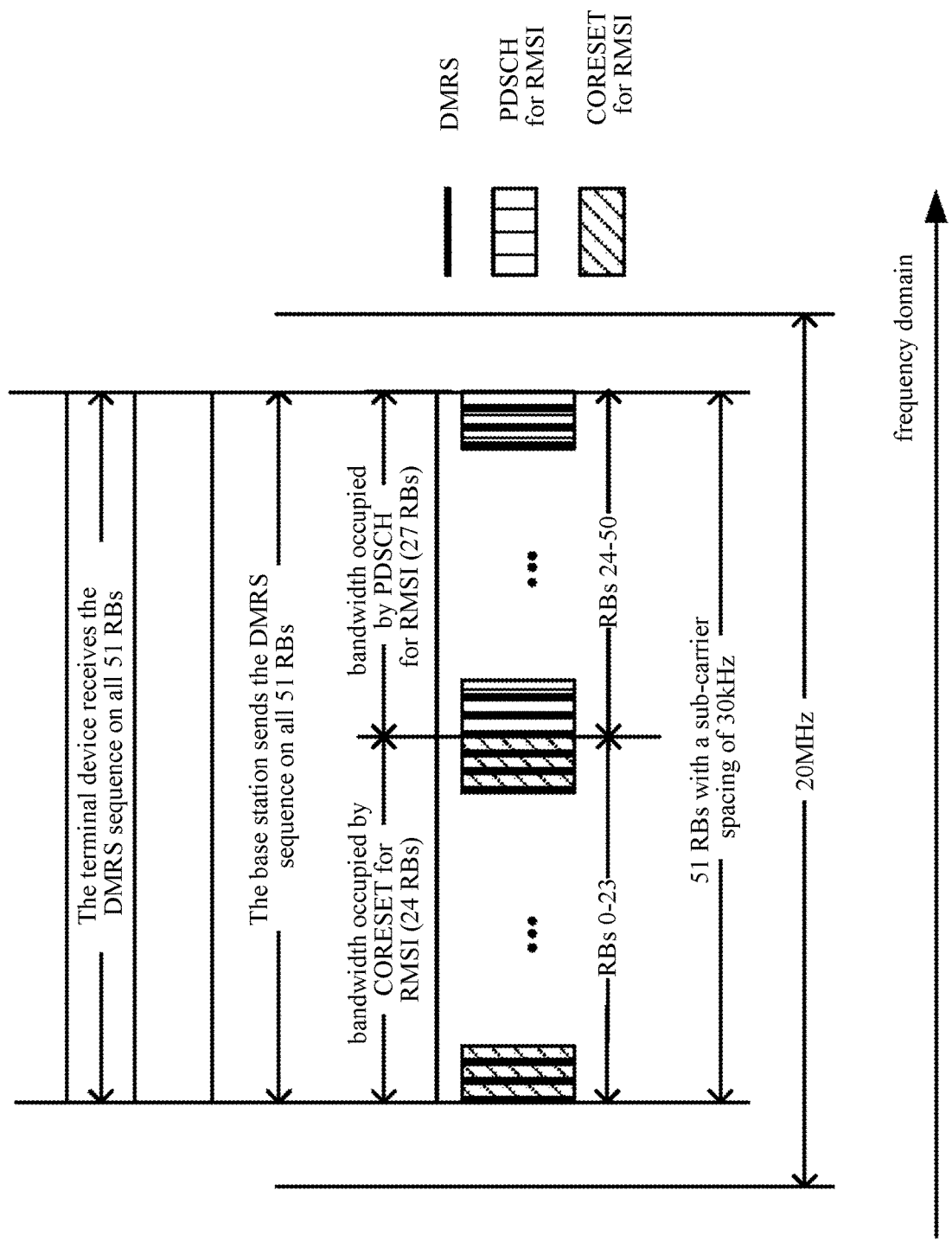
FIG. 6 is a schematic diagram showing signal transmission according to an embodiment of the present disclosure.

As the fourth embodiment, as shown in FIG. 6, the base station (PCI=7) configures CORESET for RMSI in the initial access subband (51 RBs with a sub-carrier spacing of 30 kHz within 20 MHz). The CORESET for RMSI is located on RBs 0-23 (24 RBs) in the initial access subband.

The base station (PCI=7) configures PDSCH for RMSI in the initial access subband. The PDSCH for RMSI and the CORESET for RMSI are configured in a FDM mode. The PDSCH for RMSI is located on RBs 24-50 (27 RBs) in the initial access subband.

The base station (PCI=7) sends a DMRS sequence A on the symbols of the CORESET for RMSI in the initial access subband. The DMRS sequence A contains 153 elements. The base station takes a subcarrier resulted from shifting the first subcarrier of the first RB in the initial access subband by v=3 ($v=N_{ID}^{cell}$ mod 4) subcarriers as a starting point, selects one RE every 4 REs, and a total of 153 REs are selected. The base station maps the DMRS sequence A to the positions of the above REs (the 153 selected REs) in turn and sends the DMRS sequence A. That is, the first sequence element of the DMRS sequence A is sent on the first RE selected by the base station, and the L-th element of the DMRS sequence A is sent on the L-th RE selected by the base station.

Optionally, in the fourth embodiment, the power difference between the EPRE of the DMRS and the EPRE of the SSB included in the DMRS sequence A is 0 dB, and the DMRS and the CORESET for RMSI both use NCP, and the DMRS and the CORESET for RMSI are sent using the same antenna port.

As shown in FIG. 6, in the fourth embodiment, on the symbols of the CORESET for RMSI within the bandwidth occupied by the initial access subband, the terminal device takes a subcarrier resulted from shifting the first subcarrier of the first RB in the bandwidth occupied by the initial access subband by v=3 ($v=N_{ID}^{cell}$ mod 4) subcarriers as a starting point, selects one RE every 4 REs, and a total of 153 REs are selected to receive the DMRS sequence A. The terminal device assumes that on the above selected REs (the 153 selected REs), the base station sequentially maps the DMRS sequence A from the first element to the positions of the selected REs and sends the elements in the DMRS sequence A. The first sequence element of the DMRS sequence A is sent on the first RE selected by the base station, and the L-th element of the DMRS sequence A is sent on the L-th RE selected by the base station.

Optionally, in the fourth embodiments, the terminal devices assumes that the power difference between the EPRE of the DMRS and the EPRE of the SSB is 0 dB on the above selected REs (the 153 selected REs), the DMRS and the CORESET for RMSI both use NCP, and the DMRS and the CORESET for RMSI are sent using the same antenna port. The terminal device receives all of the DMRS sequence in the bandwidth occupied by the initial access subband under the above assumptions to estimate the channel quality of the initial access subband.

Figure 7:
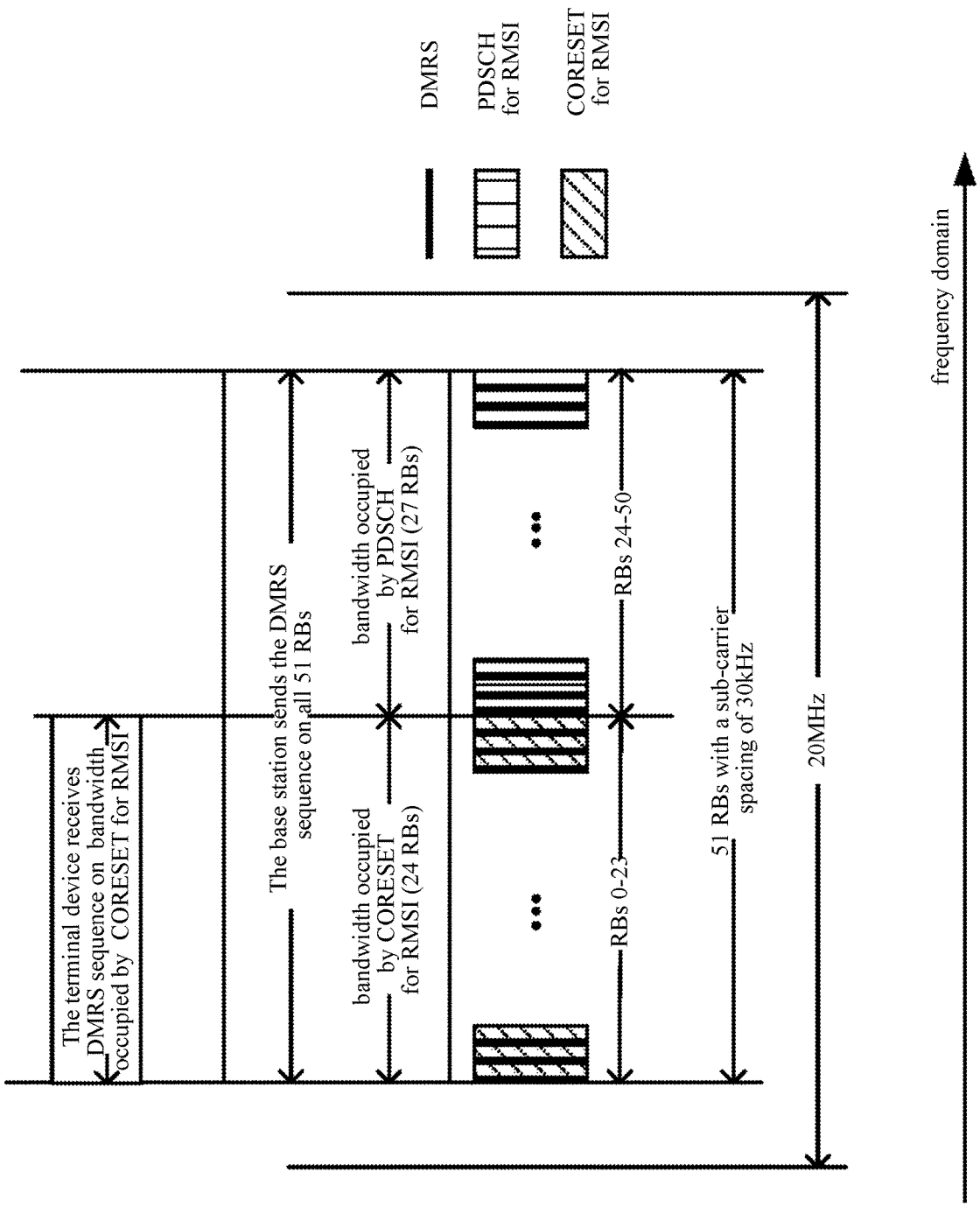
FIG. 7 is a schematic diagram showing signal transmission according to an embodiment of the present disclosure.

As the fifth embodiment, as shown in FIG. 7, the base station (PCI=7) configures CORESET for RMSI in the initial access subband (51 RBs with a sub-carrier spacing of 30 kHz within 20 MHz). The CORESET for RMSI is located on RBs 0-23 (24 RBs) in the initial access subband.

The base station (PCI=7) configures PDSCH for RMSI in the initial access subband. The PDSCH for RMSI and the CORESET for RMSI are configured in a FDM mode. The PDSCH for RMSI is located on RBs 24-50 (27 RBs) in the initial access subband.

The base station (PCI=7) sends a DMRS sequence A on the symbols of the CORESET for RMSI in the initial access subband. The DMRS sequence A contains 153 elements. The base station takes a subcarrier resulted from shifting the first subcarrier of the first RB in the initial access subband by v=3 ($v=N_{ID}^{cell}$ mod 4) subcarriers as a starting point, selects one RE every 4 REs, and a total of 153 REs are selected. The base station maps the DMRS sequence A to the positions of the above REs (the 153 selected REs) in turn and sends the DMRS sequence A. That is, the first sequence element of the DMRS sequence A is sent on the first RE selected by the base station, and the L-th element of the DMRS sequence A is sent on the L-th RE selected by the base station.

Optionally, in the fifth embodiment, the power difference between the EPRE of the DMRS and the EPRE of the SSB included in the DMRS sequence A is 0 dB, and the DMRS and the CORESET for RMSI both use NCP, and the DMRS and the CORESET for RMSI are sent using the same antenna port.

As shown in FIG. 7, in the fifth embodiment, on the symbols of the CORESET for RMSI within the bandwidth (RBs 0-23 in the initial access subband) occupied by the CORESET for RMSI, the terminal device takes a subcarrier resulted from shifting the first subcarrier of the first RB in the bandwidth occupied by the CORESET for RMSI by $v=3$ ($v=N_{ID}^{cell}$ mod 4) subcarriers as a starting point, selects one RE every 4 REs, and a total of 72 REs are selected to receive a subset of the DMRS sequence A. The terminal device assumes that on the above selected REs (the 72 selected REs), the base station sequentially maps 72 elements from the first element in the DMRS sequence A to the positions of the selected REs (the 72 selected REs) and sends the elements in the DMRS sequence A. The first sequence element of the DMRS sequence A is sent on the first RE selected by the base station, and the L-th element of the DMRS sequence A is sent on the L-th RE selected by the base station.

Optionally, in the fifth embodiments, the terminal devices assumes that the power difference between the EPRE of the DMRS and the EPRE of the SSB is 0 dB on the above selected REs (the 72 selected REs), the DMRS and the CORESET for RMSI both use NCP, and the DMRS and the CORESET for RMSI are sent using the same antenna port. The terminal device receives the DMRS sequence in the bandwidth occupied by the CORESET for RMSI under the above assumptions to estimate the channel quality of the channel occupied by the CORESET for RMSI.

Figure 8:
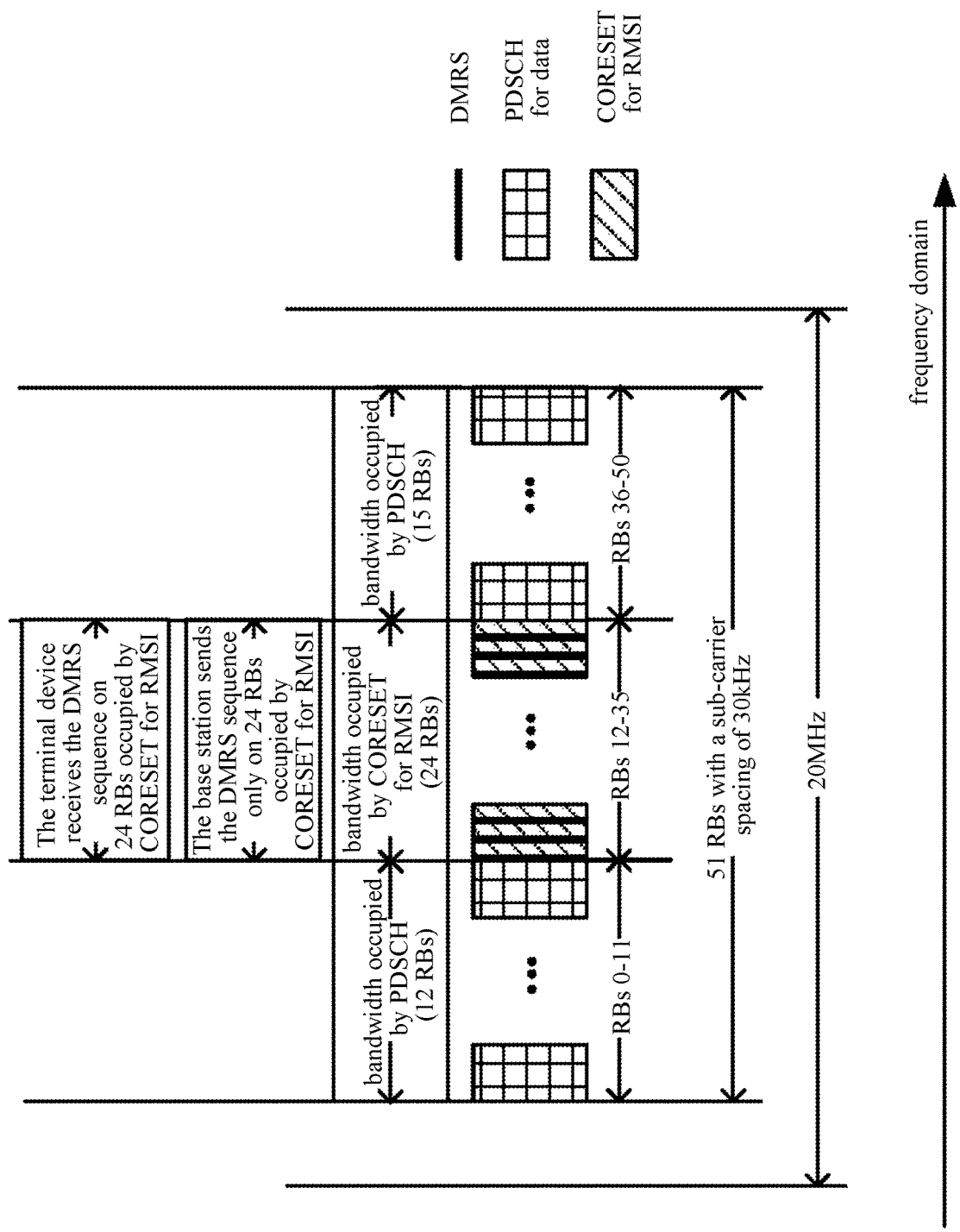
FIG. 8 is a schematic diagram showing signal transmission according to an embodiment of the present disclosure.

As the sixth embodiment, as shown in FIG. 8, the base station (PCI=7) configures CORESET for RMSI in the initial access subband (51 RBs with a sub-carrier spacing of 30 kHz within 20 MHz). The CORESET for RMSI is located on RBs 12-35 (24 RBs) in the initial access subband.

The base station (PCI=7) sends PDSCH carrying data in the initial access subband. The PDSCH carrying data and the CORESET for RMSI are sent in a FDM mode. The PDSCH carrying data is located on RBs 0-11 (12 RBs) and RBs 36-50 (15 RBs) in the initial access subband.

The base station (PCI=7) sends a part of elements of a DMRS sequence A on the symbols of the CORESET for RMSI in the frequency domain bandwidth occupied by the CORESET for RMSI. The DMRS sequence A contains 153 elements. The base station takes a subcarrier resulted from shifting the first subcarrier of the RB with the smallest number in the frequency domain bandwidth occupied by the CORESET for RMSI (the RBs 12-35 in the initial access subband, total of 24 RBs) by $v=3$ ($v=N_{ID}^{cell}$ mod 4) subcarriers as a starting point, selects one RE every 4 REs, and a total of 72 REs are selected. The base station maps 72 elements starting from the 37-th element in the DMRS sequence A (which is composed of 153 elements) to the 72 selected REs and sends the elements. That is, the base station only sends a corresponding part of the DMRS sequence A in the frequency domain bandwidth (RBs 0-23 in the initial access subband, total of 24 RBs) occupied by the CORESET for RMSI, and does not send the DMRS sequence A at the remaining positions.

Optionally, in the sixth embodiment, the power difference between the EPRE of the sent DMRS and the EPRE of the SSB is 0 dB, and the sent DMRS and the CORESET for RMSI both use NCP, and the sent DMRS and the CORESET for RMSI are sent using the same antenna port.

As shown in FIG. 8, in the sixth embodiment, on the symbols of the CORESET for RMSI within the bandwidth occupied by the CORESET for RMSI, the terminal device takes a subcarrier resulted from shifting the first subcarrier of the first RB in the bandwidth occupied by the CORESET for RMSI by $v=3$ ($v=N_{ID}^{cell}$ mod 4) subcarriers as a starting point, selects one RE every 4 REs, and a total of 72 REs are selected. The terminal device assumes that on the above REs (the 72 selected REs), the base station sequentially maps the 72 elements starting from the 37-th element in the DMRS sequence A (which is composed of 153 elements) to the 72 selected REs and sends the elements in the DMRS sequence A.

Optionally, in the sixth embodiments, the terminal devices assumes that the power difference between the EPRE of the DMRS and the EPRE of the SSB is 0 dB on the above REs, the DMRS and the CORESET for RMSI both use NCP, and the DMRS and the CORESET for RMSI are sent using the same antenna port. The terminal device receives the DMRS sequence in the bandwidth occupied by the CORESET for RMSI under the above assumptions to estimate the channel quality of the channel occupied by the CORESET for RMSI.

In embodiments of the present disclosure, when available resources are limited, embodiments of the present disclosure can unify the designs of the NR-U reference signal in the initial access subband in the unlicensed frequency band, so that when a terminal device demodulates PBCH, PDCCH, PDSCH or other channels in the NR-U reference signal, the terminal device can use the reference signal according to its actual needs. This unified design is conducive to effective use of limited time-frequency resources in the initial access subband of the unlicensed frequency band, and effective use of limited chance of success for LBT.

Figure 9:
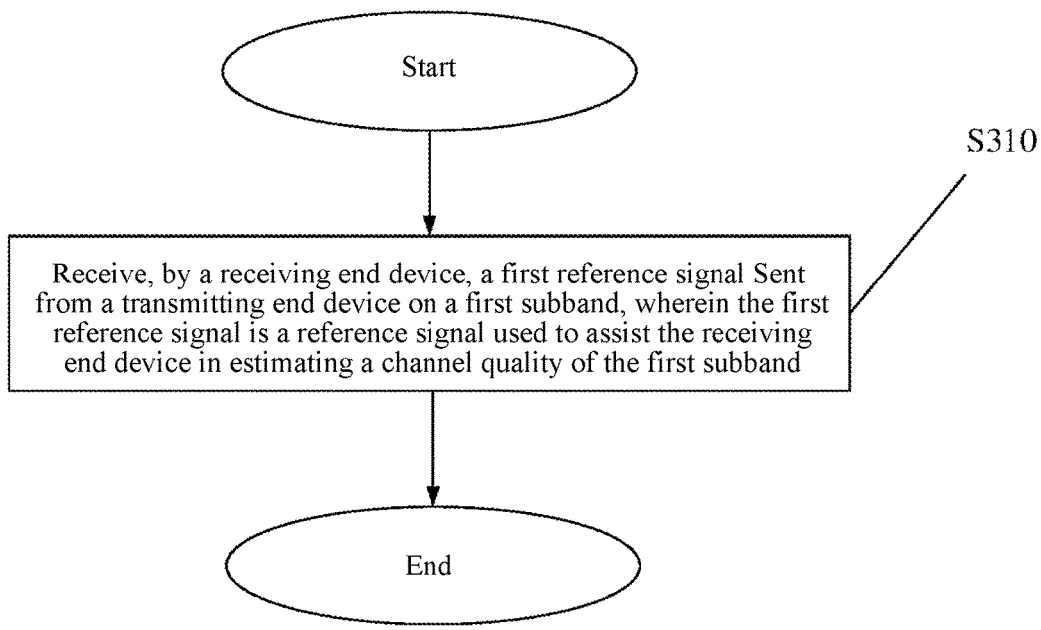
FIG. 9 is a schematic flowchart of another signal transmission method according to an embodiment of the present disclosure.

FIG. 9 is a schematic flowchart of another signal transmission method 300 according to an embodiment of the present disclosure. As shown in FIG. 9, the method 300 may include the following content:

In S310, a receiving end device receives a first reference signal sent from a transmitting end device on a first subband. The first reference signal is a reference signal used to assist the receiving end device in estimating a channel quality of the first subband.

According to embodiments, the receiving end device may be a terminal device, and the transmitting end device may be a network device.

According to embodiments, the first subband is an initial active bandwidth part on an unlicensed spectrum.

According to embodiments, the receiving end device receives the first reference signal sent from the transmitting end device at a first frequency domain position in a first time domain position in the first subband.

According to embodiments, the first frequency domain position is a part or all of a first candidate frequency domain position in the first subband.

According to embodiments, the first candidate frequency domain position is a set of subcarrier positions obtained by selecting a subcarrier from every p subcarriers with a subcarrier resulted from shifting a subcarrier k by v subcarriers as a starting point; and
    wherein the subcarrier k is a reference starting point of the first candidate frequency domain position, a position resulted from shifting the subcarrier k by v subcarriers is an actual starting point of the first candidate frequency domain position, and v and p are integers.

According to embodiments, the subcarrier k may be as follows:
the subcarrier k is a first subcarrier of a Resource Block (RB) with the smallest number in the first subband; or
the subcarrier k is a first subcarrier of a Resource Block (RB) with the smallest number in a Physical Broadcast Channel (PBCH) in the first subband; or
the subcarrier k is a first subcarrier of a Resource Block (RB) with the smallest number that partially or fully overlaps the PBCH in the first subband.

According to embodiments, v may be as follows:
v is a preset integer; or
v is an integer configured by the transmitting end device; or
v is an integer associated with a first parameter, and the transmitting end device and/or the receiving end device determines v according to the first parameter.

According to embodiments, the first parameter may be as follows:
the first parameter is a physical cell identity (ID) of the transmitting end device; or
the first parameter is a synchronization signal block index of the transmitting end device.

According to embodiments, p may be as follows:
p is a preset integer; or
p is an integer configured by the transmitting end device.

According to embodiments, the receiving end device assumes that the transmitting end device makes each element of a first candidate sequence sequentially correspond to a RE corresponding to the first candidate frequency domain position, the receiving end device, at the first candidate frequency domain position, an element of the first candidate sequence which corresponds to the first candidate frequency domain position from the transmitting end device.

According to embodiments, the first time domain position is one of the following:
a symbol position where a PSS is located;
a symbol position where a SSS is located;
a part or all of symbol positions where PBCH is located;
a part or all of symbol positions where a PDCCH for scheduling broadcast information is located;
a part or all of symbol positions of a PDSCH carrying broadcast information is located;
a part or all of symbol positions where a PDCCH for scheduling a Msg2 for random access is located;
a part or all of symbol positions where a PDSCH carrying Msg2 for random access is located;
a part or all of symbol positions where a PDCCH for scheduling a Msg4 for random access is located;
a part or all of symbol positions where a PDSCH carrying Msg4 for random access is located;
a part or all of symbol positions where a PDCCH for scheduling a paging message is located; or
a part or all of symbol positions where a PDSCH carrying the paging message is located.

According to embodiments, the first reference signal is one of the following:
DMRS for PBCH;
DMRS for PDCCH for scheduling broadcast information;
DMRS for a CORESET where a PDCCH for scheduling broadcast information is located;
DMRS for a PDSCH carrying broadcast information;
DMRS for a PDCCH for scheduling a RAR message;
DMRS for a CORESET where a PDCCH for scheduling a RAR message is located;
DMRS for a PDSCH carrying a RAR message;
DMRS for a PDCCH for scheduling a MSG4 for random access;
DMRS for a CORESET where a PDCCH for scheduling a MSG4 for random access is located;
DMRS for a PDSCH carrying a MSG4 for random access;
DMRS for a PDCCH for scheduling a paging message;
DMRS for a CORESET where a PDCCH for scheduling a paging message is located; or
DMRS for a PDSCH carrying a paging message.

According to embodiments, the receiving end device receives first information sent from the transmitting end device.

There is a fixed difference between an EPRE of the first reference signal and an EPRE of the first information.

According to embodiments, the fixed difference is M decibels, and M is an integer.

According to embodiments, M is preset on the transmitting end device or configured by the transmitting end device.

According to embodiments, the first information is one of the following:
PSS;
SSS;
PBCH;
DMRS for a PBCH;
DMRS for a PDCCH for scheduling broadcast information;
DMRS for a PDSCH carrying broadcast information;
DMRS for a PDCCH for scheduling a Msg2 for random access;
DMRS for a PDSCH carrying Msg2 for random access;
DMRS for a PDCCH for scheduling a Msg4 for random access;
DMRS for a PDSCH carrying a Msg4 for random access;
DMRS for a PDCCH for scheduling a paging message; or
DMRS for a PDSCH carrying a paging message.

According to embodiments, a subcarrier spacing of the first reference signal and a subcarrier spacing of the first information are the same.

According to embodiments, a length of a cyclic prefix of the first reference signal and a length of a cyclic prefix of the first information are the same.

Details regarding the steps of the signal transmission method 300 can be found the previous description regarding corresponding steps of the signal transmission method 200 and for brevity, repeated descriptions are omitted here.

Figure 10:
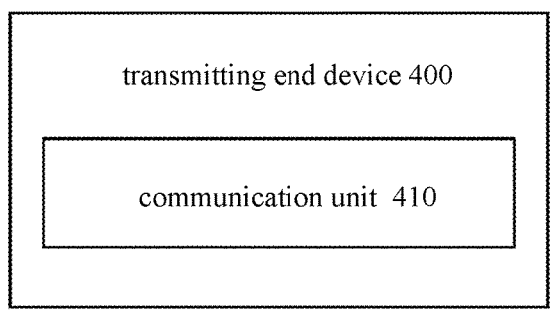
FIG. 10 is a schematic block diagram of a transmitting end device according to an embodiment of the present disclosure.

FIG. 10 is a schematic block diagram of a transmitting end device 400 according to an embodiment of the present disclosure. As shown in FIG. 10, the transmitting end device 400 includes a communication unit 410.

The communication unit 410 is configured to send a first reference signal to a receiving end device on a first subband. The first reference signal is a reference signal used to assist the receiving end device in estimating a channel quality of the first subband.

According to embodiments, the communication unit 410 is configured to:
send the first reference signal to the receiving end device at a first frequency domain position in a first time domain position in the first subband.

According to embodiments, the first frequency domain position is a part or all of a first candidate frequency domain position in the first subband.

According to embodiments, the first candidate frequency domain position is a set of subcarrier positions obtained by selecting a subcarrier from every p subcarriers with a subcarrier resulted from shifting a subcarrier k by v subcarriers as a starting point; and wherein the subcarrier k is a reference starting point of the first candidate frequency domain position, a position resulted from shifting the subcarrier k by v subcarriers is an actual starting point of the first candidate frequency domain position, and v and p are integers.

According to embodiments, the subcarrier k is a first subcarrier of a Resource Block (RB) with the smallest number in the first subband; or
the subcarrier k is a first subcarrier of a Resource Block (RB) with the smallest number in a Physical Broadcast Channel (PBCH) in the first subband; or
the subcarrier k is a first subcarrier of a Resource Block (RB) with the smallest number that partially or fully overlaps the PBCH in the first subband.

According to embodiments, v is a preset integer; or
v is an integer configured by the transmitting end device; or
v is an integer associated with a first parameter, and the transmitting end device and/or the receiving end device determines v according to the first parameter.

According to embodiments, the first parameter is a physical cell identity (ID) of the transmitting end device; or
the first parameter is a synchronization signal block index of the transmitting end device.

According to embodiments, p is a preset integer; or
p is an integer configured by the transmitting end device.

According to embodiments, the transmitting end device 400 further includes a processing unit 420.

The processing unit 420 is configured to generate a first candidate sequence.

The processing unit 420 is further configured to make each element of the first candidate sequence sequentially correspond to a RE corresponding to the first candidate frequency domain position.

The processing unit 420 is further configured to send, at the first candidate frequency domain position, an element of the first candidate sequence which corresponds to the first candidate frequency domain position to the receiving end device as the first reference signal.

According to embodiments, the first time domain position is one of the following:
a symbol position where a PSS is located;
a symbol position where a SSS is located;
a part or all of symbol positions where PBCH is located;
a part or all of symbol positions where a PDCCH for scheduling broadcast information is located;
a part or all of symbol positions of a PDSCH carrying broadcast information is located;
a part or all of symbol positions where a PDCCH for scheduling a Msg2 for random access is located;
a part or all of symbol positions where a PDSCH carrying Msg2 for random access is located;
a part or all of symbol positions where a PDCCH for scheduling a Msg4 for random access is located;
a part or all of symbol positions where a PDSCH carrying Msg4 for random access is located;
a part or all of symbol positions where a PDCCH for scheduling a paging message is located; or
a part or all of symbol positions where a PDSCH carrying the paging message is located.

According to embodiments, the first reference signal is one of the following:
DMRS for PBCH;
DMRS for PDCCH for scheduling broadcast information;
DMRS for a Control Resource Set (CORESET) where a PDCCH for scheduling broadcast information is located;
DMRS for a PDSCH carrying broadcast information;
DMRS for a PDCCH for scheduling a RAR message;
DMRS for a CORESET where a PDCCH for scheduling a RAR message is located;
DMRS for a PDSCH carrying a RAR message;
DMRS for a PDCCH for scheduling a MSG4 for random access;
DMRS for a CORESET where a PDCCH for scheduling a MSG4 for random access is located;
DMRS for a PDSCH carrying a MSG4 for random access;
DMRS for a PDCCH for scheduling a paging message;
DMRS for a CORESET where a PDCCH for scheduling a paging message is located; or
DMRS for a PDSCH carrying a paging message.

According to embodiments, the communication unit 410 is further configured to:
send first information to the receiving end device;
wherein there is a fixed difference between an Energy Per Resource Element (EPRE) of the first reference signal and an EPRE of the first information.

According to embodiments, the fixed difference is M decibels, and M is an integer.

According to embodiments, M is preset on the transmitting end device or configured by the transmitting end device.

According to embodiments, the first information is one of the following:
PSS; SSS; PBCH; DMRS for a PBCH; DMRS for a PDCCH for scheduling broadcast information; DMRS for a PDSCH carrying broadcast information; DMRS for a PDCCH for scheduling a Msg2 for random access; DMRS for a PDSCH carrying Msg2 for random access; DMRS for a PDCCH for scheduling a Msg4 for random access; DMRS for a PDSCH carrying a Msg4 for random access; DMRS for a PDCCH for scheduling a paging message; or DMRS for a PDSCH carrying a paging message.

According to embodiments, a subcarrier spacing of the first reference signal and a subcarrier spacing of the first information are the same.

According to embodiments, a length of a cyclic prefix of the first reference signal and a length of a cyclic prefix of the first information are the same.

According to embodiments, the first subband is an initial active bandwidth part on an unlicensed spectrum.

According to embodiments, the transmitting end device 400 is a network device.

It should be understood that the transmitting end device 400 according to embodiments of the present disclosure may correspond to the transmitting end device in the method embodiments of the present disclosure, and the above and other operations and/or functions of each unit in the transmitting end device 400 are used to implement corresponding processes performed by the transmitting end device in the method 200 shown in FIG. 2. For the sake of brevity, repeated descriptions are omitted here.

Figure 11:
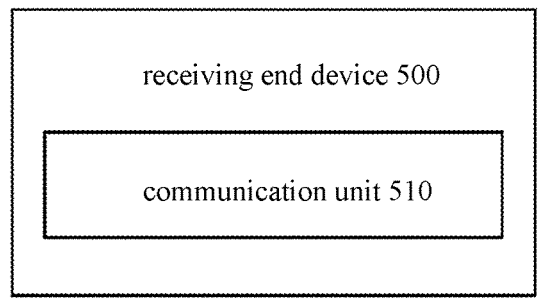
FIG. 11 is a schematic block diagram of a receiving end device according to an embodiment of the present disclosure.

FIG. 11 is a schematic block diagram of a receiving end device 500 according to an embodiment of the present disclosure. As shown in FIG. 11, the receiving end device 500 includes a communication unit 510.

The communication unit 510 is configured to receive a first reference signal sent from a transmitting end device on a first subband. The first reference signal is a reference signal used to assist the receiving end device in estimating a channel quality of the first subband.

According to embodiments, the communication unit 510 is configured to:

receive the first reference signal sent from the transmitting end device at a first frequency domain position in a first time domain position in the first subband.

According to embodiments, the first frequency domain position is a part or all of a first candidate frequency domain position in the first subband.

According to embodiments, the first candidate frequency domain position is a set of subcarrier positions obtained by selecting a subcarrier from every p subcarriers with a subcarrier resulted from shifting a subcarrier k by v subcarriers as a starting point; and wherein the subcarrier k is a reference starting point of the first candidate frequency domain position, a position resulted from shifting the subcarrier k by v subcarriers is an actual starting point of the first candidate frequency domain position, and v and p are integers.

According to embodiments, the subcarrier k is a first subcarrier of a Resource Block (RB) with the smallest number in the first subband; or the subcarrier k is a first subcarrier of a Resource Block (RB) with the smallest number in a Physical Broadcast Channel (PBCH) in the first subband; or the subcarrier k is a first subcarrier of a Resource Block (RB) with the smallest number that partially or fully overlaps the PBCH in the first subband.

According to embodiments, v is a preset integer; or v is an integer configured by the transmitting end device; or v is an integer associated with a first parameter, and the transmitting end device and/or the receiving end device determines v according to the first parameter.

According to embodiments, the first parameter is a physical cell identity (ID) of the transmitting end device; or the first parameter is a synchronization signal block index of the transmitting end device.

According to embodiments, p is a preset integer; or p is an integer configured by the transmitting end device.

According to embodiments, the receiving end device 500 further includes a processing unit 520.

The processing unit 520 is configured to, assuming that the transmitting end device makes elements of a first candidate sequence sequentially correspond to a Resource Element (RE) corresponding to the first candidate frequency domain position, receive, at the first candidate frequency domain position, an element of the first candidate sequence which corresponds to the first candidate frequency domain position from the transmitting end device.

According to embodiments, the first time domain position is one of the following:

a symbol position where a PSS is located;
a symbol position where a SSS is located;
a part or all of symbol positions where PBCH is located;
a part or all of symbol positions where a PDCCH for scheduling broadcast information is located;
a part or all of symbol positions of a PDSCH carrying broadcast information is located;
a part or all of symbol positions where a PDCCH for scheduling a Msg2 for random access is located;
a part or all of symbol positions where a PDSCH carrying Msg2 for random access is located;
a part or all of symbol positions where a PDCCH for scheduling a Msg4 for random access is located;
a part or all of symbol positions where a PDSCH carrying Msg4 for random access is located;
a part or all of symbol positions where a PDCCH for scheduling a paging message is located; or
a part or all of symbol positions where a PDSCH carrying the paging message is located.

According to embodiments, the first reference signal is one of the following:

DMRS for PBCH;
DMRS for PDCCH for scheduling broadcast information;
DMRS for a CORESET where a PDCCH for scheduling broadcast information is located;
DMRS for a PDSCH carrying broadcast information;
DMRS for a PDCCH for scheduling a RAR message;
DMRS for a CORESET where a PDCCH for scheduling a RAR message is located;
DMRS for a PDSCH carrying a RAR message;
DMRS for a PDCCH for scheduling a MSG4 for random access;
DMRS for a CORESET where a PDCCH for scheduling a MSG4 for random access is located;
DMRS for a PDSCH carrying a MSG4 for random access;
DMRS for a PDCCH for scheduling a paging message;
DMRS for a CORESET where a PDCCH for scheduling a paging message is located; or
DMRS for a PDSCH carrying a paging message.

the communication unit is further configured to:

receive first information sent from the transmitting end device;

wherein there is a fixed difference between an Energy Per Resource Element (EPRE) of the first reference signal and an EPRE of the first information.

According to embodiments, the fixed difference is M decibels, and M is an integer.

According to embodiments, M is preset on the transmitting end device or configured by the transmitting end device.

According to embodiments, the first information is one of the following:

PSS; SSS; PBCH; DMRS for a PBCH; DMRS for a PDCCH for scheduling broadcast information; DMRS for a PDSCH carrying broadcast information; DMRS for a PDCCH for scheduling a Msg2 for random access; DMRS for a PDSCH carrying Msg2 for random access; DMRS for a PDCCH for scheduling a Msg4 for random access; DMRS for a PDSCH carrying a Msg4 for random access; DMRS for a PDCCH for scheduling a paging message; or DMRS for a PDSCH carrying a paging message.

According to embodiments, a subcarrier spacing of the first reference signal and a subcarrier spacing of the first information are the same.

According to embodiments, a length of a cyclic prefix of the first reference signal and a length of a cyclic prefix of the first information are the same.

According to embodiments, the first subband is an initial active bandwidth part on an unlicensed spectrum.

According to embodiments, the receiving end device 500 is a terminal device.

It should be understood that the receiving end device 500 according to embodiments of the present disclosure may correspond to the receiving end device in the method embodiments of the present disclosure, and the above and other operations and/or functions of each unit in the receiving end device 500 are used to implement corresponding processes performed by the receiving end device in the method 300 shown in FIG. 9. For the sake of brevity, repeated descriptions are omitted here.

Figure 12:
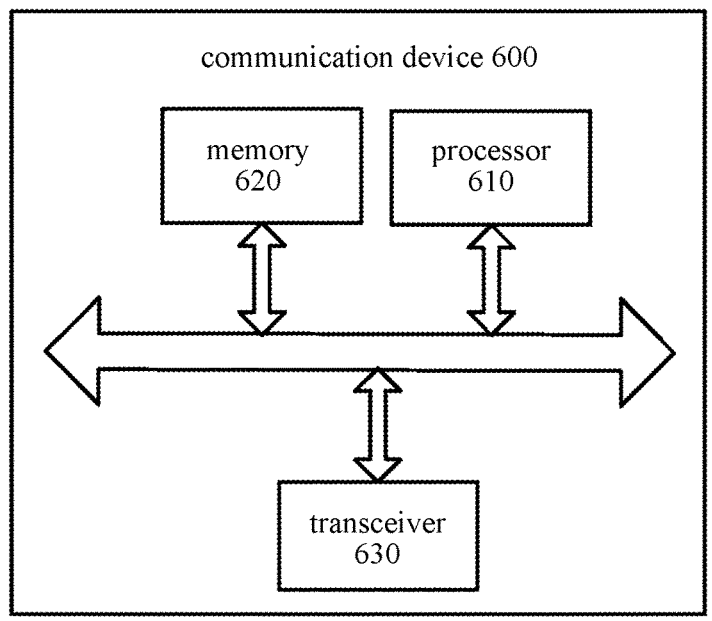
FIG. 12 is a schematic block diagram of a communication device according to an embodiment of the present disclosure.

FIG. 12 is a schematic structural diagram of a communication device 600 according to an embodiment of the present disclosure. The communication device 600 shown in FIG. 12 includes a processor 610, and the processor 610 may call and run a computer program from a memory to perform the method in embodiments of the present disclosure.

According to embodiments, as shown in FIG. 12, the communication device 800 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 12, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the transmitting end device in embodiments of the present disclosure, and the communication device 600 may implement the corresponding processes implemented by the transmitting end device in the method embodiments of the present disclosure. For brevity, details are not repeated here.

According to embodiments, the communication device 600 may specifically be the receiving end device according to an embodiment of the present disclosure, and the communication device 600 may implement the corresponding processes implemented by the receiving end device in the method embodiments of the present disclosure. For brevity, details are not repeated here.

Figure 13:
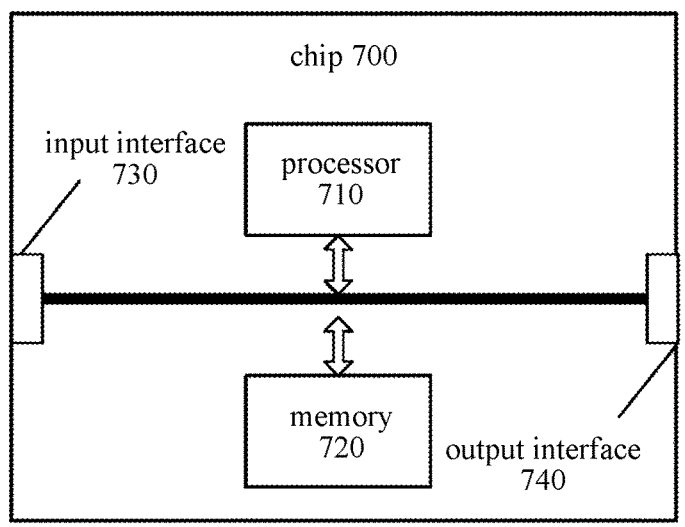
FIG. 13 is a schematic block diagram of a chip according to an embodiment of the present disclosure.

FIG. 13 is a schematic structural diagram of a chip according to an embodiment of the present disclosure. The chip 700 shown in FIG. 13 includes a processor 710, and the processor 710 can call and run a computer program from a memory to implement the method according to embodiments of the present disclosure.

According to embodiments, as shown in FIG. 13, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the transmitting end device in embodiments of the present disclosure, and the chip can implement the corresponding processes implemented by the transmitting end device in various methods according to embodiments of the present disclosure. For brevity, details are not repeated herein again.

According to embodiments, the chip can be applied to the receiving end device in embodiments of the present disclosure, and the chip can implement the corresponding processes implemented by the receiving end device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 14:
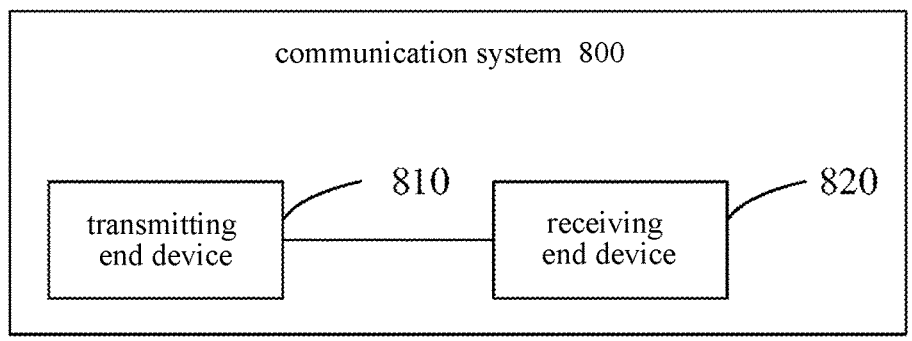
FIG. 14 is a schematic block diagram of a communication system according to an embodiment of the present disclosure.

FIG. 14 is a schematic block diagram of a communication system 800 according to an embodiment of the present disclosure. As shown in FIG. 14, the communication system 800 includes a transmitting end device 810 and a receiving end device 820.

The transmitting end device 810 can be used to implement corresponding functions which are implemented by the transmitting end device in the method embodiments, and the receiving end device 820 can be used to implement corresponding functions which are implemented by the receiving end device in the method embodiments. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure further provides a computer-readable storage medium for storing computer programs.

According to embodiments, the computer-readable storage medium may be applied to the transmitting end device in embodiments of the present disclosure, and the computer programs cause a computer to perform the corresponding processes implemented by the transmitting end device in each method embodiment of the present disclosure. For brevity, repeated descriptions are omitted here.

According to embodiments, the computer-readable storage medium may be applied to the receiving end device in embodiments of the present disclosure, and the computer programs cause a computer to perform the corresponding processes implemented by the receiving end device in each method embodiment of the present disclosure. For brevity, repeated descriptions are omitted here.

An embodiment of the present disclosure provides a computer program product, including computer program instructions.

According to embodiments, the computer program product may be applied to the transmitting end device in embodiments of the present disclosure, and the computer program instructions cause a computer to perform the corresponding processes implemented by the transmitting end device in each method embodiment of the present disclosure. For brevity, repeated descriptions are omitted here.

According to embodiments, the computer program product may be applied to the receiving end device in embodiments of the present disclosure, and the computer program instructions cause a computer to perform the corresponding processes implemented by the receiving end device in each method embodiment of the present disclosure. For brevity, repeated descriptions are omitted here.

An embodiment of the present disclosure also provides a computer program.

According to embodiments, the computer program may be applied to the transmitting end device in embodiments of the present disclosure, and when the computer program runs on a computer, the computer is caused to perform the corresponding processes implemented by the transmitting end device in each method embodiment of the present disclosure. For brevity, repeated descriptions are omitted here.

According to embodiments, the computer program may be applied to the receiving end device in embodiments of the present disclosure, and when the computer program runs on a computer, the computer is caused to perform the corresponding processes implemented by the receiving end device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A signal transmission method, comprising:
sending, by a transmitting end device, a first reference signal to a receiving end device on a first subband, wherein the first reference signal is a reference signal used to assist the receiving end device in estimating a channel quality of the first subband, wherein the first subband is an initial active bandwidth part on an unlicensed spectrum;
wherein sending, by the transmitting end device, the first reference signal to a receiving end device on the first subband comprises:

sending, by the transmitting end device, the first reference signal to the receiving end device at a first frequency domain position in a first time domain position in the first subband;

wherein the first frequency domain position is a part or all of a first candidate frequency domain position in the first subband;

wherein the first candidate frequency domain position is a set of subcarrier positions obtained by selecting a subcarrier from every p subcarriers with a subcarrier resulted from shifting a subcarrier k by v subcarriers as a starting point; and wherein the subcarrier k is a reference starting point of the first candidate frequency domain position, a position resulted from shifting the subcarrier k by v subcarriers is an actual starting point of the first candidate frequency domain position, and v and p are integers.

2. The method according to claim 1, wherein:

the subcarrier k is a first subcarrier of a Resource Block (RB) with the smallest number in the first subband; or the subcarrier k is a first subcarrier of a Resource Block (RB) with the smallest number in a Physical Broadcast Channel (PBCH) in the first subband; or the subcarrier k is a first subcarrier of a Resource Block (RB) with the smallest number that partially or fully overlaps the PBCH in the first subband.

3. The method according to claim 1, further comprising:

generating, by the transmitting end device, a first candidate sequence;

making each element of the first candidate sequence sequentially correspond to a Resource Element (RE) corresponding to the first candidate frequency domain position by the transmitting end device; and sending, at the first candidate frequency domain position by the transmitting end device, an element of the first candidate sequence which corresponds to the first candidate frequency domain position to the receiving end device as the first reference signal.

4. The method according to claim 1, wherein the first time domain position is one of the following:

a symbol position where a Primary Synchronization Signal (PSS) is located;

a symbol position where a Secondary Synchronization Signal (SSS) is located;

a part or all of symbol positions where PBCH is located;

a part or all of symbol positions where a Physical Downlink Control Channel (PDCCH) for scheduling broadcast information is located;

a part or all of symbol positions of a Physical Downlink Shared Channel (PDSCH) carrying broadcast information is located;

a part or all of symbol positions where a PDCCH for scheduling a message 2 (Msg2) for random access is located;

a part or all of symbol positions where a PDSCH carrying Msg2 for random access is located;

a part or all of symbol positions where a PDCCH for scheduling a message 4 (Msg4) for random access is located;

a part or all of symbol positions where a PDSCH carrying Msg4 for random access is located;

a part or all of symbol positions where a PDCCH for scheduling a paging message is located; or a part or all of symbol positions where a PDSCH carrying the paging message is located.

5. The method according to claim 1, wherein the first reference signal is one of the following:

Demodulation Reference Signal (DMRS) for PBCH;

DMRS for PDCCH for scheduling broadcast information;

DMRS for a Control Resource Set (CORESET) where a PDCCH for scheduling broadcast information is located;

DMRS for a PDSCH carrying broadcast information;

DMRS for a PDCCH for scheduling a Random Access Response (RAR) message;

DMRS for a CORESET where a PDCCH for scheduling a RAR message is located;

DMRS for a PDSCH carrying a RAR message;

DMRS for a PDCCH for scheduling a MSG4 for random access;

DMRS for a CORESET where a PDCCH for scheduling a MSG4 for random access is located;

DMRS for a PDSCH carrying a MSG4 for random access;

DMRS for a PDCCH for scheduling a paging message;

DMRS for a CORESET where a PDCCH for scheduling a paging message is located; or

DMRS for a PDSCH carrying a paging message.

6. The method according to claim 1, further comprising:

sending, by the transmitting end device, first information to the receiving end device;

wherein there is a fixed difference between an Energy Per Resource Element (EPRE) of the first reference signal and an EPRE of the first information.

7. A signal transmission method, comprising:

receiving, by a receiving end device, a first reference signal from a transmitting end device on a first subband, wherein the first reference signal is a reference signal used to assist the receiving end device in estimating a channel quality of the first subband, wherein the first subband is an initial active bandwidth part on an unlicensed spectrum;

wherein receiving, by the receiving end device, the first reference signal from the transmitting end device on the first subband comprises:

receiving, by the receiving end device, the first reference signal from the transmitting end device at a first frequency domain position in a first time domain position in the first subband;

wherein the first frequency domain position is a part or all of a first candidate frequency domain position in the first subband;

wherein the first candidate frequency domain position is a set of subcarrier positions obtained by selecting a subcarrier from every p subcarriers with a subcarrier resulted from shifting a subcarrier k by v subcarriers as a starting point; and wherein the subcarrier k is a reference starting point of the first candidate frequency domain position, a position resulted from shifting the subcarrier k by v subcarriers is an actual starting point of the first candidate frequency domain position, and v and p are integers.

8. A transmitting end device, comprising:

a memory for storing computer programs; and a processor;

wherein the processor is configured to execute the computer programs to:

control a transceiver to send a first reference signal to a receiving end device on a first subband, wherein the first reference signal is a reference signal used to assist the receiving end device in estimating a channel quality of the first subband, wherein the first subband is an initial active bandwidth part on an unlicensed spectrum;

wherein the processor is configured to execute the computer programs to control the transceiver to:

send the first reference signal to the receiving end device at a first frequency domain position in a first time domain position in the first subband;

wherein the first frequency domain position is a part or all of a first candidate frequency domain position in the first subband;

wherein the first candidate frequency domain position is a set of subcarrier positions obtained by selecting a subcarrier from every p subcarriers with a subcarrier resulted from shifting a subcarrier k by v subcarriers as a starting point; and wherein the subcarrier k is a reference starting point of the first candidate frequency domain position, a position resulted from shifting the subcarrier k by v subcarriers is an actual starting point of the first candidate frequency domain position, and v and p are integers.

9. The transmitting end device according to claim 8, wherein:

the subcarrier k is a first subcarrier of a Resource Block (RB) with the smallest number in the first subband; or the subcarrier k is a first subcarrier of a Resource Block (RB) with the smallest number in a Physical Broadcast Channel (PBCH) in the first subband; or the subcarrier k is a first subcarrier of a Resource Block (RB) with the smallest number that partially or fully overlaps the PBCH in the first subband.

10. The transmitting end device according to claim 8, wherein:

v is a preset integer; or v is an integer configured by the transmitting end device; or v is an integer associated with a first parameter, and the transmitting end device and/or the receiving end device determines v according to the first parameter.

11. The transmitting end device according to claim 10, wherein:

the first parameter is a physical cell identity (ID) of the transmitting end device; or the first parameter is a synchronization signal block index of the transmitting end device.

* * * * *